United States Patent

Porfido et al.

[11] Patent Number: 5,670,012
[45] Date of Patent: Sep. 23, 1997

[54] ELECTRICALLY WELDABLE PLASTIC FITTING

[75] Inventors: Erasmo Porfido, Schaffhausen, Switzerland; Michael Bamberger, Gailingen, Germany

[73] Assignee: Georg Fischer Rohrleitungssysteme AG, Schaffhausen, Switzerland

[21] Appl. No.: 369,405

[22] Filed: Jan. 5, 1995

[30] Foreign Application Priority Data

Jan. 10, 1994 [CH] Switzerland ............ 00 057/94

[51] Int. Cl.⁶ .............. B27G 11/02; B31F 5/04; B32B 31/24
[52] U.S. Cl. .............. 156/379.7; 156/304.2; 156/304.6; 156/274.2; 219/535; 219/544
[58] Field of Search .............. 156/158, 304.2, 156/304.6, 273.9, 274.2, 379.7; 219/59.1, 61.2, 497, 535, 544

[56] References Cited

U.S. PATENT DOCUMENTS

| 4,486,650 | 12/1984 | Bridgstock et al. | 219/544 |
| 4,602,148 | 7/1986 | Ramsey | 219/535 |
| 4,639,580 | 1/1987 | Johnson | 219/541 |
| 4,642,154 | 2/1987 | Thalmann et al. | 156/274.2 X |
| 4,695,335 | 9/1987 | Lyall | 156/274.2 X |
| 5,116,082 | 5/1992 | Handa et al. | 285/21 |
| 5,141,580 | 8/1992 | Dufour et al. | 156/158 |

FOREIGN PATENT DOCUMENTS

| 1549169 | 7/1979 | United Kingdom | 156/304.2 |

*Primary Examiner*—David A. Simmons
*Assistant Examiner*—Paul M. Rivard
*Attorney, Agent, or Firm*—Bachman & LaPointe, P.C.

[57] ABSTRACT

A fitting formed as a welding sleeve has, preferably, two heating elements and is provided in the region of the plug contacts with a plate which can be inserted into a recess. On the plate is arranged a resistor and the connections for measuring the ohmic resistance by means of a welding apparatus. By measuring the resistance, the type of the fitting can be identified and the current to be fed to the welding apparatus determined.

6 Claims, 2 Drawing Sheets

ELECTRICALLY WELDABLE PLASTIC FITTING

BACKGROUND OF THE INVENTION

The present invention relates to an electrically weldable plastic fitting for welding plastic pipe.

Fittings of the aforementioned type are known. EP A-0525339 shows such fittings developed as welding sleeves, in which case they can be developed with one or with two heating elements.

Further different plastic fittings for welded connections are, for instance, tees having three heating elements, crosses with four heating elements, or collars or saddles with one heating mat.

For each of these different fittings a different welding program is required for the introduction of the electric heating. In one known welding apparatus which is necessary for the feeding of the welding energy, such welding programs are stored in the apparatus (see Bulletin of Georg Fischer Rohrleitungssysteme AG, No. Fi 1788/1 of Apr. 1993), each program being activated only by a connecting cable which is different for each type of fitting. For each type of fitting, a separate coded connecting cable is necessary.

The object of the present invention is to create fittings having coded directly thereon the type of fitting.

SUMMARY OF THE INVENTION

The foregoing object is achieved by the present invention wherein a resistor associated with the fitting has a resistance which identifies the fitting type and the current to be fed from the welding apparatus.

BRIEF DESCRIPTION OF THE DRAWINGS

The invention is shown, by way of example, in the accompanying drawings and is described below. In the drawings.

DETAILED DESCRIPTION

Figure 1:
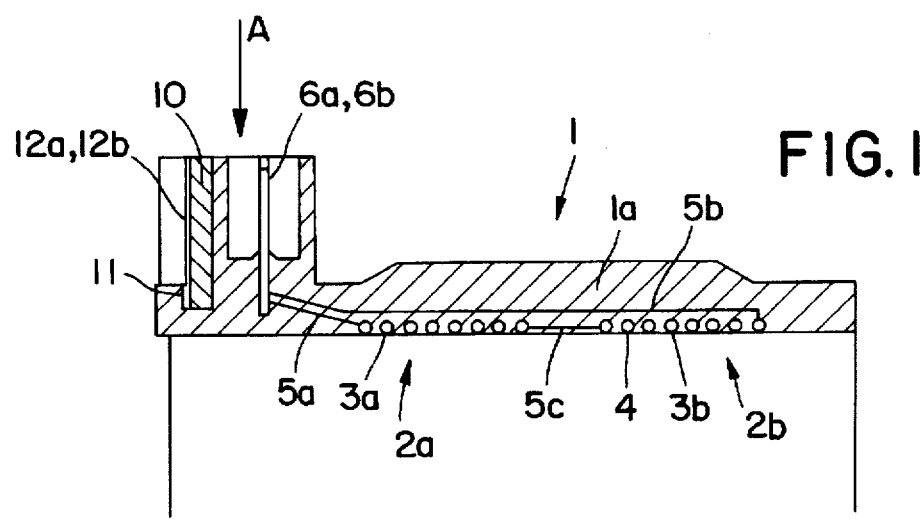
FIG. 1 is a partial longitudinal section through a fitting developed as welding sleeve having two heating elements.
Figure 2:
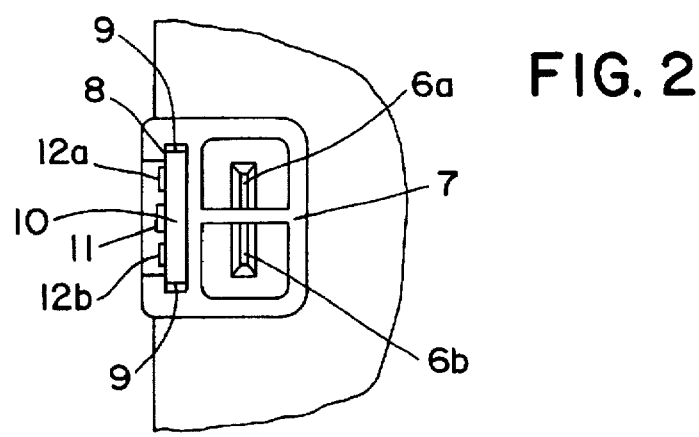
FIG. 2 is a partial top view seen in the direction A of FIG. 1.

The fitting 1 of a weldable plastic which is shown in FIGS. 1 and 2 and is developed as a welding sleeve, has a sleeve-shaped welding portion 2a, 2b for each pipe which is to be connected, on the inner circumference of which portion a heating element 3a, 3b is arranged, it consisting of a spirally wound resistance wire 4.

The front end of the heating element 3a is connected by a connecting wire 5a to a plug contact 6a, and the rear end of the heating element 3b is connected by a connecting wire 5b to a plug contact 6b, the two heating elements 3a, 3b being arranged spaced axially apart and being connected to each other by a connecting wire 5c. As can be noted from FIG. 2, the two plug contacts 6a, 6b are arranged peripherally alongside of each other and, protected by a surrounding wall 7, on the fitting 1.

The wall 7 which is connected with the fitting has a recess 8 which is provided with guide grooves 9 and in which a plate 10 preferably consisting of plastic can be inserted.

The plate 10 is provided with a resistor 11 and with connections 12a, 12b for connection to a welding apparatus. The resistor has a given ohmic resistance which is measured by the welding apparatus after connecting the welding apparatus cables to the resistor. The measured resistance identifies the type of weld sleeve (in the case of the illustrated fitting, a weld sleeve having two heating elements 3a and 3b) and the current to be fed from the welding apparatus to the heating elements of the weld sleeve.

Figure 3:
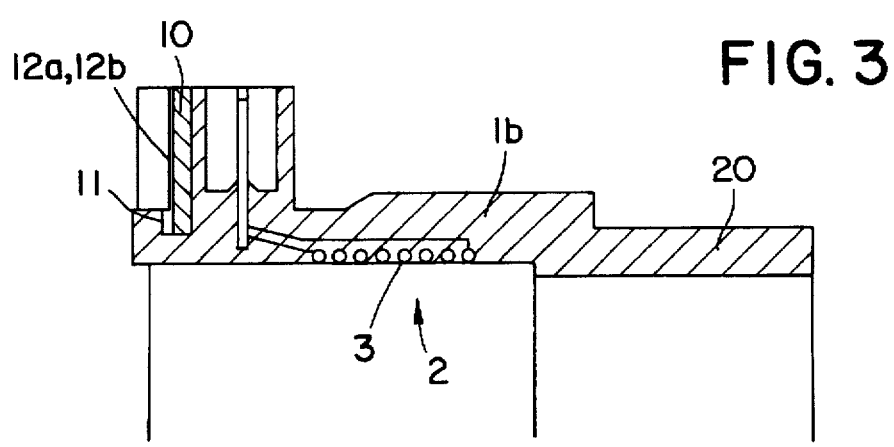
FIG. 3 is a variant embodiment of FIG. 1, with one heating element.

FIG. 3 shows a welding sleeve 1b having only one welding part 2 having a heating element 3 and a cylindrical pipe length 20, for instance for a socket-welding connection or a clamping threaded connection for connecting to other fittings or pipes. This fitting is also provided with a plate 10 having a resistor 11 the ohmic resistance of which identifies this fitting as welding sleeve 1b with one heating element 3.

The fitting can also be developed as an elbow with one or two heating elements, as a tee with three heating elements, or as a cross with four heating elements, in which connection, in each case, a different plate having a different resistance is provided the resistance of which is determined in accordance with the type of fitting and the number of heating elements.

The fitting can also be developed as a part which can be placed on the pipe, it having a saddle part and branch connection, for instance, as a collar clamp or a saddle, in which case the heating element then is a heating mat which at least partially surrounds the circumference of the pipe. The resistor which can be placed on then identifies that this is a fitting having one heating mat.

Figure 4:
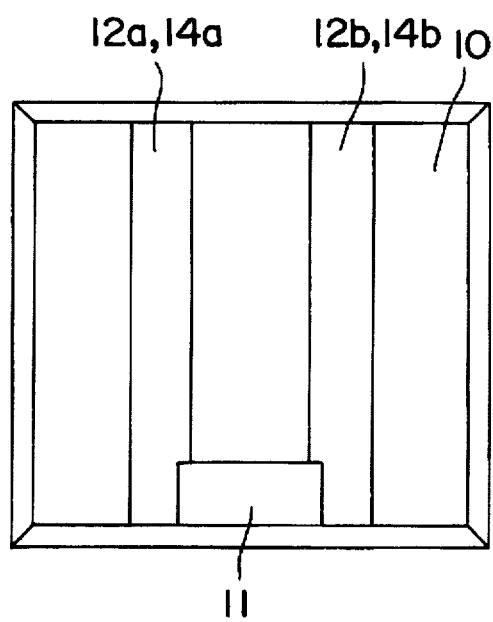
FIG. 4 is an enlarged front view of a plate, such as shown in FIGS. 1 to 3, inserted into the fitting.
Figure 5:
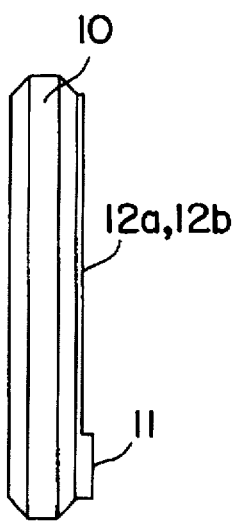
FIG. 5 is a side view of FIG. 4.
Figure 6:
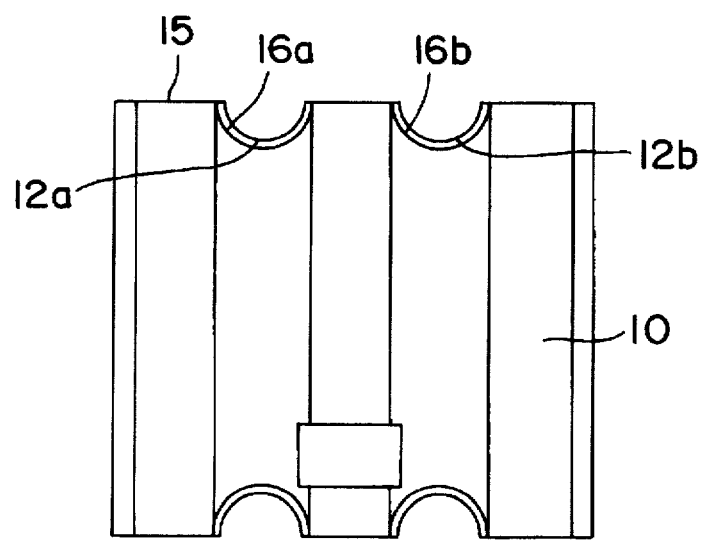
FIG. 6 shows a variant embodiment of the plate shown in FIG. 4.

FIGS. 4 and 5 show the plate 10 with the resistor 11 arranged on one surface of the plate and the connections 12a, 12b, the resistor 11 and the connections 12a, 12b being connected to each other. It is possible for the resistor 11 to be arranged on one surface of the plate and the connections 12a, 12b on the other surface of the plate and to be connected to each other by wires passed through the plate 10.

The connections 12a, 12b are developed as two flat contact surfaces 14a, 14b arranged parallel to each other on the plate 10 and preferably consisting of a metal sheet.

A variant embodiment of the plate 10 is shown in FIG. 5, in which the connections 12a, 12b are provided at least on one circumferential side 15 of the plate 10 in arcuate recesses 16a, 16b which are provided with metallic contact surfaces.

Correspondingly developed plugs of the connecting cable are then pressed against the contact surfaces into the recesses.

In addition to the arrangement of the resistor 11 on the insertable plate 10, the resistor can also be integrated in the fitting by extrusion around it upon the production of the fitting in the injection molding process, in which case the connections can also be applied to the fitting during the injection molding or subsequently.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

We claim:

1. An electrically weldable plastic fitting having at least one welding part having a heating element consisting of a resistance wire for the production of a weld connection wherein the heating element is connected with plug contacts for the feeding of current from a welding apparatus, the improvement which comprises a resistor having a given resistance located on the fitting, the resistor having connections for connection to the welding apparatus wherein the resistance of the resistor serves to identify the fitting type wherein the resistor together with the connections are arranged on a plastic plate which is placed in a recess formed on the fitting.

2. A fitting according to claim 1 wherein the resistor is arranged on one surface of the plate and the connections on the other surface of the plate wherein the resistor and connections are connected with each other by lines extending through the plate.

3. A fitting according to claim 1 wherein the recess is provided with guide grooves.

4. A fitting according to claim 1 wherein the connections are formed as two flat contact surfaces arranged parallel to each other on the plate.

5. A fitting according to claim 1 wherein the connections are formed on at least one peripheral side of the plate in arcuate recesses.

6. A fitting according to claim 1 wherein the fitting is formed as a welding sleeve for connection to at least one pipe and includes at least one resistance wire wherein the resistor has an ohmic resistance which is determined as a function of the number of resistance wires.

* * * * *